US012422767B2

(12) United States Patent
Sato

(10) Patent No.: US 12,422,767 B2
(45) Date of Patent: Sep. 23, 2025

(54) FIXING APPARATUS AND IMAGE FORMING APPARATUS USING SAME

(71) Applicant: CANON KABUSHIKI KAISHA, Tokyo (JP)

(72) Inventor: Noriaki Sato, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 25 days.

(21) Appl. No.: 18/506,653

(22) Filed: Nov. 10, 2023

(65) Prior Publication Data

US 2024/0077818 A1 Mar. 7, 2024

Related U.S. Application Data

(60) Division of application No. 17/854,843, filed on Jun. 30, 2022, now Pat. No. 11,874,618, which is a continuation of application No. 17/169,214, filed on Feb. 5, 2021, now Pat. No. 11,402,779.

(30) Foreign Application Priority Data

Feb. 12, 2020 (JP) ................................ 2020-021763

(51) Int. Cl.
*G03G 15/20* (2006.01)

(52) U.S. Cl.
CPC ....... *G03G 15/205* (2013.01); *G03G 15/2053* (2013.01); *G03G 15/2064* (2013.01)

(58) Field of Classification Search
CPC ............. G03G 15/205; G03G 15/2035; G03G 15/2039; G03G 15/2042; G03G 15/2053; G03G 15/5012
See application file for complete search history.

(56) References Cited

U.S. PATENT DOCUMENTS

2011/0135325 A1* 6/2011 Hitaka ............... G03G 15/2039 399/21
2015/0323890 A1 11/2015 Nakamoto
2015/0338815 A1* 11/2015 Tanaka .................. G03G 15/20 399/21
2018/0032009 A1 2/2018 Ogura
2018/0210380 A1* 7/2018 Uchiyama .......... G03G 15/2042

FOREIGN PATENT DOCUMENTS

CN 104914695 A 9/2015
JP 2020003615 A 1/2020

* cited by examiner

*Primary Examiner* — Thomas S Giampaolo, II
(74) *Attorney, Agent, or Firm* — Canon U.S.A., Inc. IP Division

(57) ABSTRACT

An image forming apparatus includes an image forming portion, a fixing portion, and a control portion. The fixing portion forms a nip portion to nip a recording material and includes heat-generating elements along a direction orthogonal to a conveying direction of the recording material. The fixing portion fixes the image on the recording material using heat. The image forming apparatus changes a control target temperature for each heating area heated by each of the heat-generating elements in accordance with the image to be formed on the recording material. When forming the image after a jam clearing process in which the recording material nipped in the nip portion is removed, the control portion changes a distribution of a control target temperature of the whole heater in the direction in which the heat-generating elements are aligned to a second distribution different from a first distribution corresponding to the image.

10 Claims, 14 Drawing Sheets

FIXING APPARATUS AND IMAGE FORMING APPARATUS USING SAME

CROSS-REFERENCE TO RELATED APPLICATIONS

The present application is a divisional of U.S. patent application Ser. No. 17/854,843, filed Jun. 30, 2022, which is a continuation of U.S. patent application Ser. No. 17/169, 214, filed on Feb. 5, 2021 and issued as U.S. Pat. No. 11,402,779 on Aug. 2, 2022, which claims priority from Japanese Patent Application No. 2020-021763 filed Feb. 12, 2020, all of which are hereby incorporated by reference herein in their entireties.

BACKGROUND

Field

The present disclosure relates to a fixing apparatus that heats a recording material to fix an image formed thereon. The disclosure also relates to an image forming apparatus such as a copier and printer equipped with this fixing apparatus as image fixing unit.

Description of the Related Art

Image forming apparatuses that form an unfixed toner image corresponding to image information on a recording material such as paper or glossy film by an image forming process such as electrophotography, electrostatic recording, and magnetic recording are known. In such an image forming apparatus, to fix a toner image on the surface of a recording material as a permanently fixed image, a heating process (fixing treatment) is performed by a fixing apparatus whereby the toner image is melted and fixed with the recording material.

A film heating type fixing apparatus such as the one shown in Japanese Patent Application Laid-open No. H04-44075 is known. The main section of the fixing apparatus of this type is configured by a fixing film, a heater in contact with an inner surface of the fixing film, and a pressure roller making pressure contact with the heater via the fixing film to form a nip portion. The film heating type fixing apparatus is characterized by the quickness to start up and excellent power-saving feature because of the small thermal capacity. Meanwhile, in response to the ever-increasing demand for saving energy in recent years, a selective heating type that heats areas of the recording material formed with an image has been proposed (Japanese Patent Application Laid-open No. H06-95540). This type uses a heater configured with a plurality of heat-generating elements that are aligned along a direction orthogonal to the conveying direction of the recording material (hereinafter referred to as longitudinal direction) and can be independently controlled to generate a given amount of heat. Power is selectively supplied to heat-generating elements corresponding to areas where an image passes, to selectively heat image portions.

In the event of a jam (paper jam) in the image forming apparatus, even in the middle of image formation, the apparatus may interrupt the operation and stop. In the case where the apparatus stops while a recording material carrying unfixed toner thereon passes through the fixing nip portion of the fixing apparatus, the recording material remains nipped in the fixing nip portion. The user accordingly needs to carry out a process known as jam clearing process in which the user opens a door of the apparatus and removes the recording material from the fixing unit. During this process, the toner of the unfixed image may adhere to the fixing film or pressure roller of the fixing apparatus. Normally, such adhered toner is removed, after the pause status has been cancelled, and the apparatus has recovered to a state capable of restarting image formation, every time the recording material passes through the fixing apparatus for image formation thereafter. However, with a fixing apparatus of the type that selectively heat image portions that are portions of the recording material where an unfixed image is formed, such as the fixing apparatus of Japanese Patent Application Laid-open No. H06-95540, the following situations may arise: For example, if, after the recovery from a jam, recording materials carrying an image with a larger area of non-image portions that are portions where no unfixed image will be formed than the area of the previously formed image portions are continuously fed, it is possible that contaminating toner adhered to the fixing film or pressure roller may not be removed.

SUMMARY

The disclosure herein includes description of an image forming apparatus equipped with a fixing apparatus, which heats image portions selectively, and is capable of swiftly removing toner adhered to a fixing film or a pressure roller after a pause in the image forming operation.

According to an aspect of the present disclosure, an image forming apparatus includes an image forming portion configured to form an image on a recording material, a fixing portion that includes a nip portion forming member configured to form a nip portion to nip the recording material, and a heater having a plurality of heat-generating elements aligned along a direction orthogonal to a conveying direction of the recording material, wherein the fixing portion is configured to heat the image formed on the recording material utilizing heat of the heater at the nip portion to fix the image on the recording material, and a control portion configured to control power supplied to the plurality of heat-generating elements, wherein the image forming apparatus is configured to change a control target temperature for each of a plurality of heating areas heated by each of the plurality of heat-generating elements in accordance with the image to be formed on the recording material, and wherein, when forming the image after a jam clearing process in which the image forming apparatus is stopped and the recording material nipped in the nip portion is removed, the control portion changes a distribution of a first control target temperature of the whole heater in the direction in which the plurality of heat-generating elements are aligned to a second distribution different from a first distribution corresponding to the image.

By making the distributions of the heater or fixing film different before and after a pause in the image forming operation caused by a jam or the like, the image forming apparatus of the present disclosure can prevent adhered toner that is hard to remove, which may arise in a fixing apparatus that selectively heats image portions, when non-image areas are repeatedly heated after the pause.

Further features of the present disclosure will become apparent from the following description of exemplary embodiments with reference to the attached drawings.

DESCRIPTION OF THE EMBODIMENTS

Hereinafter, a description will be given, with reference to the drawings, of embodiments (examples) of the present disclosure. However, the sizes, materials, shapes, their relative arrangements, or the like of constituents described in the embodiments may be appropriately changed according to the configurations, various conditions, or the like of apparatuses to which the disclosure is applied. Therefore, the sizes, materials, shapes, their relative arrangements, or the like of the constituents described in the embodiments do not intend to limit the scope of the disclosure to the following embodiments.

Example 1

The most characteristic feature of this example is change of the distribution of the control target temperatures (temperature distribution) of the heater (or fixing film) so that it is different before and after a pause in image forming operation for carrying out a jam clearing process to remove a recording material P nipped in the nip portion of a fixing apparatus provided in the image forming apparatus.

First, configuration examples of the image forming apparatus and fixing apparatus are roughly described, after which the heater configuration of the fixing apparatus that is able to selectively heat an image portion, and a method of selectively heating an image portion are described. This is followed by a description of the differences in a longitudinal temperature distribution before and after a pause, which is the characteristic feature of the present disclosure.

Schematic Configuration Example of Image Forming Apparatus

Figure 1:
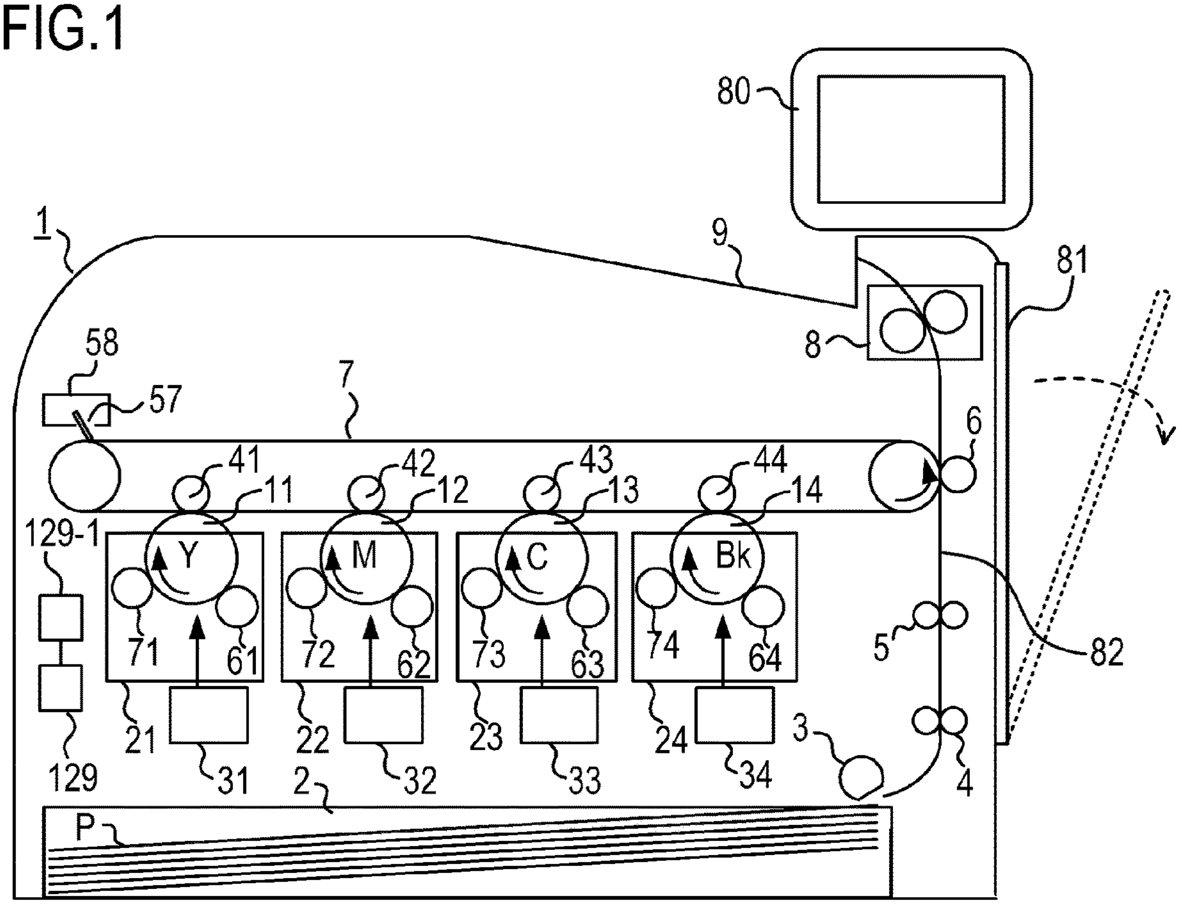
FIG. 1 is a schematic configuration diagram of an image forming apparatus in Example 1.

FIG. 1 illustrates a schematic configuration of an image forming apparatus in this example. The image forming apparatus 1 forms an image on a recording material P supplied from a tray 2 that accommodates the recording material P. An image forming portion includes toner cartridges 21 to 24 respectively composed of photosensitive members 11 to 14, charging rollers 61 to 64 that charge the surfaces of the photosensitive members, and developing rollers 71 to 74 that develop latent images on the photosensitive members with toner, and scanner units 31 to 34 that write latent images on the photosensitive members. This image forming portion forms unfixed images prior to a fixing process by the fixing apparatus 8 to be described later on the recording material P.

The photosensitive members 11 to 14 are in contact with primary transfer rollers 41 to 44 via an intermediate transfer belt (ITB) 7. Toner images formed on photosensitive members of respective colors are successively transferred in superposition (primary transfer) on the intermediate transfer belt 7 that is conveyed at a constant speed by a positive voltage applied to the primary transfer rollers. That is, a yellow (Y) image is first transferred onto the intermediate transfer belt 7, and magenta (M), cyan (C), and black (Bk) images are transferred thereon in this order, to form a color image. With the rotation of the intermediate transfer belt 7, the color image is transferred to a secondary transfer portion where a secondary transfer roller 6 and the intermediate transfer belt 7 make contact.

Meanwhile, the recording material P in the tray 2 is fed out one by one by a paper feed roller 3, and conveyed by a pair of conveying rollers 4 at a constant speed of 200 mm/sec to a pair of registration rollers 5. The recording material P that has reached the pair of registration rollers 5 is then conveyed to the secondary transfer roller 6 in a matching timing with the image formed on the intermediate transfer belt 7. The color image is then transferred from the intermediate transfer belt 7 onto the recording material P (secondary transfer) by the secondary transfer roller 6 charged with a positive voltage. Residual toner on the intermediate transfer belt 7 that was not transferred onto the recording material P is scraped off by a cleaning blade 57 that is disposed in contact with the intermediate transfer belt, and collected in a recovery container 58. The fixing apparatus 8 is provided as a fixing portion downstream of the secondary transfer roller 6. The recording material P carrying an image transferred thereon undergoes an image fixing process with application of heat and pressure in the fixing apparatus 8, before being discharged onto a discharge tray 9 on the top of the printer. The image forming apparatus is able to form an image on recording materials as large as a letter size (215.9 mm in width).

The image forming apparatus is connected to a terminal device (not shown) such as a PC directly or via a network so that a user can send an instruction to form images to the image forming apparatus via the terminal device. The image forming apparatus stops image formation when it detects a jam or the like, and displays the detection contents and a handling process such as a jam clearing process in a display portion 80, and at the same time transmits the same to the terminal device. The contents of detection and handling process are displayed on the terminal device, too, to notify the user. The image forming apparatus includes a control portion 129 to control the series of these operations.

When the apparatus pauses upon detection of a jam (paper jam) or the like, depending on the case, the user may carry out a jam clearing process to remove the recording material remaining in a conveyance path 82 of the recording material. When this is the case, the user opens a door 81 that is provided on the right side of the apparatus in FIG. 1 and can be opened and closed to remove the recording material remaining in the conveyance path 82. In the case where the apparatus is at a halt with a recording material stuck in the fixing apparatus 8, the fixing apparatus is removed from the main body of the apparatus as required, and the recording material is pulled out from an entrance side or exit side of the fixing apparatus and removed.

Configuration Example of Fixing Apparatus

Figure 2:
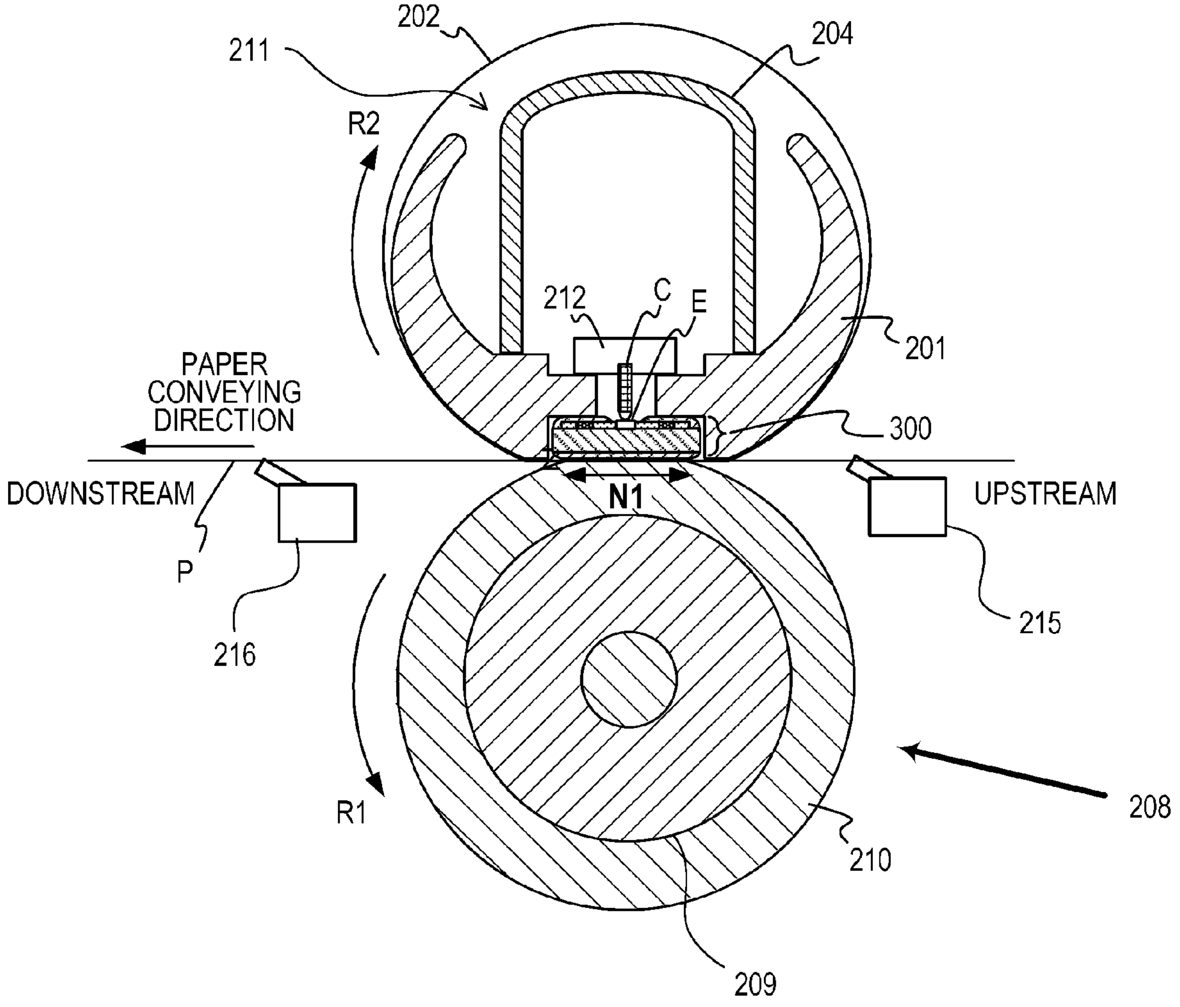
FIG. 2 is a schematic cross-sectional view of a fixing apparatus in Example 1.

Next, a configuration example of the fixing apparatus is described. FIG. 2 is a schematic cross-sectional view of the fixing apparatus 8. The fixing apparatus 8 includes: a fixing film 202 that is a fixing member, a heater 300 disposed inside the fixing film 202 as a heating member, a pressure roller 208 that is a pressure member making contact with an outer surface of the fixing film 202 and forming a fixing nip portion N1 together with the heater 300 via the fixing film 202, and a metal stay 204. The heater 300, a heater holding member 201 to be described later, and the metal stay 204 form a heater unit 211. The configuration including these fixing film 202 and pressure roller 208 corresponds to a nip portion forming member that forms the fixing nip portion N1 in this example.

The fixing film 202 is a tubular double-layer heat-resistant film, having a base layer made of a heat-resistant resin such as polyimide, or metal such as stainless steel. A coating of a heat-resistant resin having excellent release properties such as a copolymer of tetrafluoroethylene and perfluoroalkyl vinyl ether (PFA) is provided on the surface of the fixing film 202 to form a release layer to prevent toner adhesion and to ensure releasability of the recording material P. Additionally, an elastic layer of heat-resistant rubber such as silicone rubber may be formed between the base layer and the release layer for better image quality.

The pressure roller 208 includes a core 209 made of iron, aluminum or the like and an elastic layer 210 made of silicone rubber or the like.

The heater 300 is held by the heater holding member 201 made of a heat-resistant resin, and heats the fixing film 202 by applying heat to heating areas A1 to A7 (to be described later in detail) provided inside the fixing nip portion N1. The heater holding member 201 also serves the function of guiding the rotation of the fixing film 202. The heater 300 is provided with an electrode E on the opposite side (back side) from the side in contact with the inner surface of the fixing film 202, power being supplied to the electrode E from an electrical contact C. A safety device 212 such as a thermal switch or temperature fuse is disposed opposite the back side of the heater 300 to cut the power supplied to the heater 300 when activated by an abnormally high temperature of the heater 300.

The metal stay 204 presses the heater holding member 201 and heater 300 toward the pressure roller 208, with a force supplied from a pressing mechanism (not shown). This creates the fixing nip portion N1 where the fixing film 202 makes tight contact with the pressure roller 208. Then, the fixing film 202 is sandwiched between the heater 300 and the pressure roller 208.

The pressure roller 208 rotates in the direction of arrow R1 by the power from a motor (not shown). The rotation of the pressure roller 208 causes the fixing film 202 to rotate along in the direction of arrow R2. The unfixed toner image is fixed on the recording material P with the use of the heat from the heater via the fixing film 202 while the recording material P is nipped and conveyed in the fixing nip portion N1. To ensure slidability of the fixing film 202 and to allow for stable rotation when driven, high-temperature resistant, fluorine-based lubricating grease (not shown) is interposed between the heater 300 and the fixing film 202.

The fixing apparatus 8 of this example includes a separation mechanism (not shown) that separates the heater 300 and the heater holding member 201 from the pressure roller 208. In the event of the apparatus being paused due to a jam or the like with the recording material P nipped in the fixing nip portion N1, a separating operation is performed with the use of the separation mechanism to allow easy removal of the recording material P stuck in the fixing nip portion N1. The fixing apparatus 8 further includes an entrance recording material sensor 215 and an exit recording material sensor 216 respectively at the entrance side and the exit side in the conveying direction of the recording material P, as detection portions that detect the position of the recording material P to determine the presence or absence of the recording material. Using these sensors enables detection of whether or not the recording material P is remaining in the fixing apparatus 8 when the apparatus is paused.

Configuration of Heater Capable of Selectively Heating Image Portions

Figure 3A:
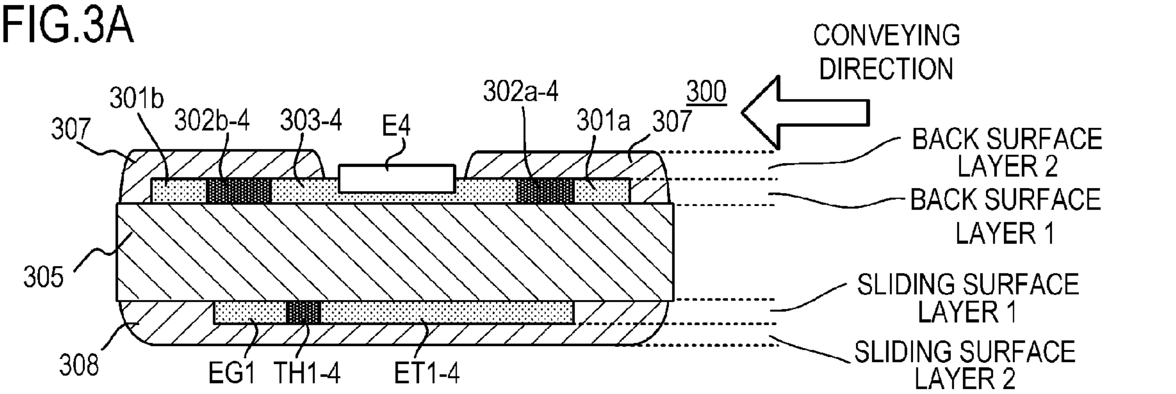
FIG. 3A is a cross-sectional view and FIG. 3B is a plan view of a heater in Example 1.
Figure 3B:
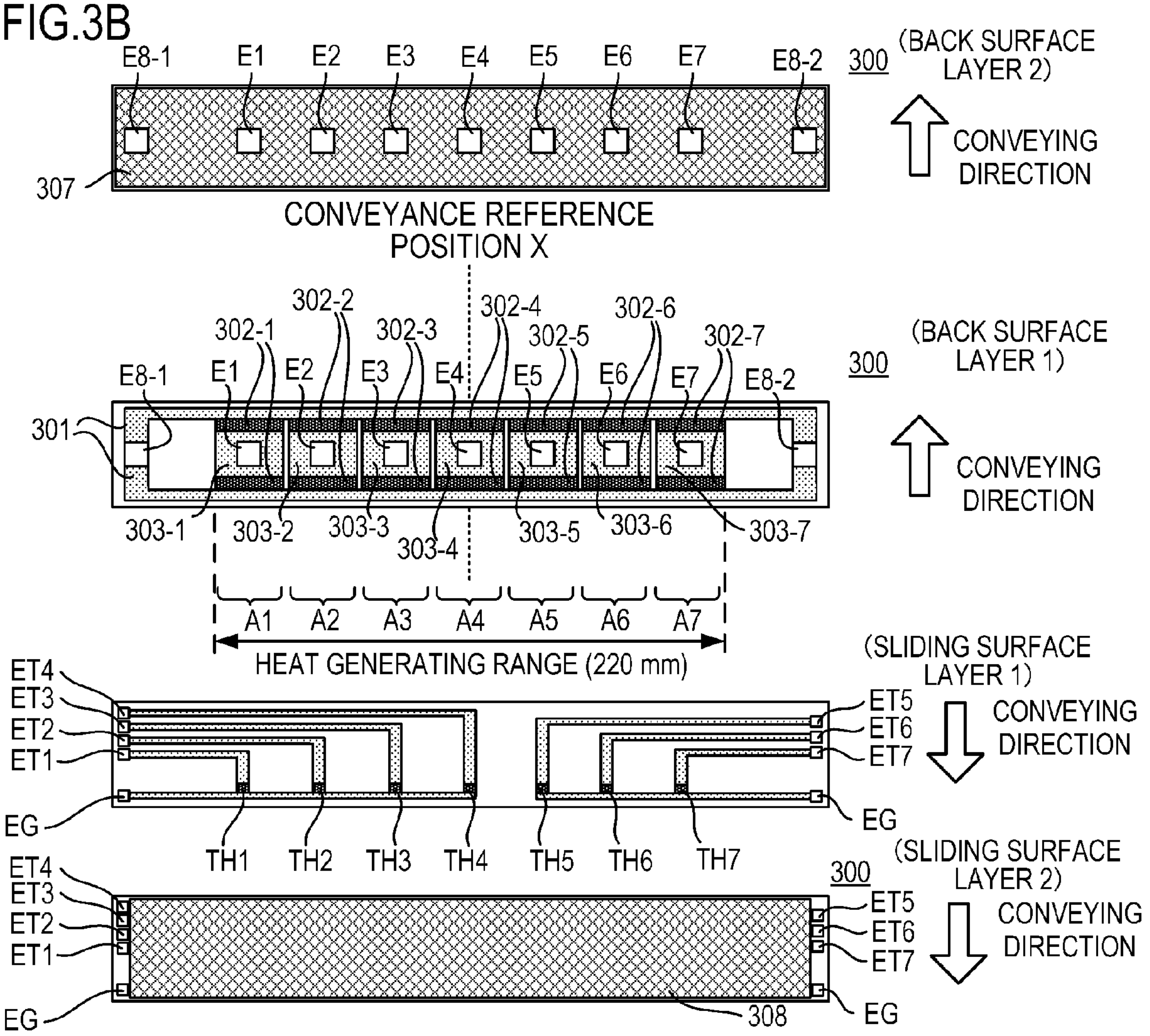

Next, the configuration of the heater 300 in this example is described with reference to FIGS. 3A and 3B. FIG. 3A is a cross-sectional view of the heater 300 and FIG. 3B is a plan view of various layers of the heater 300. FIG. 3B indicates a conveyance reference position X of the recording material P in the image forming apparatus 1 of this example. The conveyance reference in this example is located at the center. The recording material P is conveyed such that its centerline, which is the center in the direction orthogonal to the conveying direction (longitudinal direction), is in alignment with the conveyance reference position X. FIG. 3A is a cross-sectional view of the heater 300 at the conveyance reference position X.

The heater 300 is made up of a ceramic substrate 305, a first back surface layer provided on the substrate 305, a second back surface layer covering the first back surface layer, a first sliding surface layer provided on the opposite side from the first back surface layer on the substrate 305, and a second sliding surface layer covering the first sliding surface layer.

A plurality of heat-generating elements 302 for which power supply is independently controllable are aligned along the longitudinal direction (302-1 to 302-7) on the first back surface layer. In this example, seven heat-generating elements of the same width (31.4 mm) are aligned such that the entire length will be 220 mm. Any number of heat-generating elements may be provided, and the width of the heat-generating elements may vary depending on the location. Reference symbols E1 to E8-2 in the drawing denote electrical contacts (power supply electrodes) for supplying power to the heat-generating elements. Reference numerals 301 and 303-1 to 303-7 denote conductor patterns that electrically connect the electrical contacts and the heat-generating elements.

Various such patterns thus configured form power supply paths for an electric current to flow, from power supply electrodes E1 to E7, of E1 to E8-2, provided for discrete heat-generating elements, via respective conductor patterns 303-1 to 303-7 and heat-generating elements 302-1 to 302-7, to the electrodes E8-1 and E8-2 via the conductor patterns 301.

Longitudinal areas respectively heated by the heat-generating elements 302-1 to 302-7 aligned along the longitudinal direction will be respectively referred to as heating areas A1 to A7 below. The second back surface layer is made of an insulating surface protection layer 307 (glass in this example) and covers conductors 301*a* and 301*b*, conductor 303, and heat-generating element 302. The surface protection layer 307 is not formed at the spot where there is the electrode E4, so that an electrical contact C (not shown) can be connected to the electrode E4 from the second back side of the heater.

In the first sliding surface layer on the opposite side from the first back surface layer of the substrate 305, thermistors TH (TH-1 to TH-7) that are temperature detecting elements are provided for detecting the temperatures in respective heating areas A1 to A7 of the heater where respective heat-generating elements 302-1 to 302-7 are disposed. Also provided are conductors ET1 to ET7 that function as independent wiring patterns for reading signals indicating temperatures detected by the thermistors, and conductors EG that function as power supply wiring patterns shared by the thermistors.

Providing temperature detecting elements for respective heating areas heated by the heat-generating elements enables control of the heating areas A1 to A7 of the heater aligned along the longitudinal direction independently to different temperatures. The second sliding surface layer is made of a surface protection layer 308 having slidability and insulating properties (glass in this example) and covers the thermistors TH, and conductors ET and EG, while at the same time ensures the slidability on the inner surface of the fixing film 202. The surface protection layer 308 is not formed at both longitudinal ends of the heater 300 to allow formation of electrical contacts to be connected to the conductors ET and EG.

Method of Selectively Heating Image Portions

Next, a method of selectively heating image portions that are portions on the recording material formed with the unfixed image mentioned above in the fixing apparatus 8 equipped with the heater capable of independently controlling the temperatures of the respective heating areas is described. Let us assume, for example, that images are formed on portions denoted at 401, 402, and 403 in FIG. 4 on a recording material such as paper of a letter size or the like.

The control portion 129 first divides the images into discrete longitudinal heating areas (A1 to A7) based on image information acquired by an acquisition portion 129-1. The control portion 129 then calculates the timing at which distal ends of the images reach the fixing nip portion N1 and the timing at which rear ends of the images move past the fixing nip portion N1 in each of the divided heating areas. The control portion 129 keeps the heater temperature (or fixing film temperature) of each heating area at a level that allows fixing only during the time in which the image is passing through the fixing nip portion in each heating area. Here, an example in the case of the heating area A3 is described with reference to FIG. 4, as well as FIG. 5, which is a diagram showing the temporal changes of the control target temperature for the heating area A3 of the heater.

Figure 4:
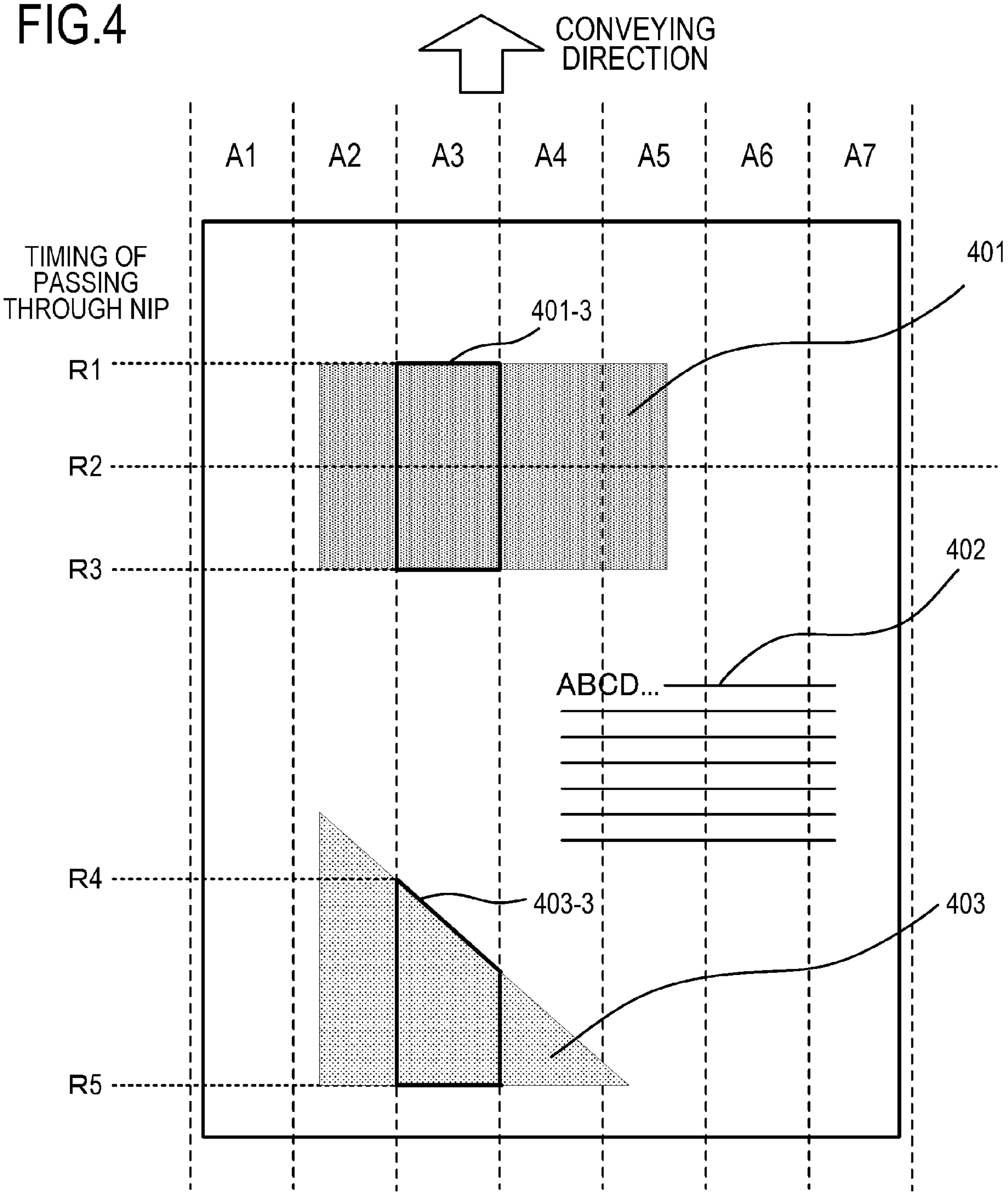
FIG. 4 is a diagram illustrating an image on a recording material divided into heating areas in Example 1.

As illustrated in FIG. 4, a portion 401-3 of the image 401 and a portion 403-3 of the image 403 pass through the heating area A3. The timing at which the distal end of the image portion 401-3 reaches the fixing nip portion N1 in the heating area A3, and the timing at which the rear end passes the fixing nip portion N1, are represented as R1 and R3, respectively. Similarly, the timing at which the distal end of the image 403-3 reaches the fixing nip portion N1 in the heating area A3, and the timing at which the rear end passes the fixing nip portion N1, are represented as R4 and R5, respectively.

Figure 5:
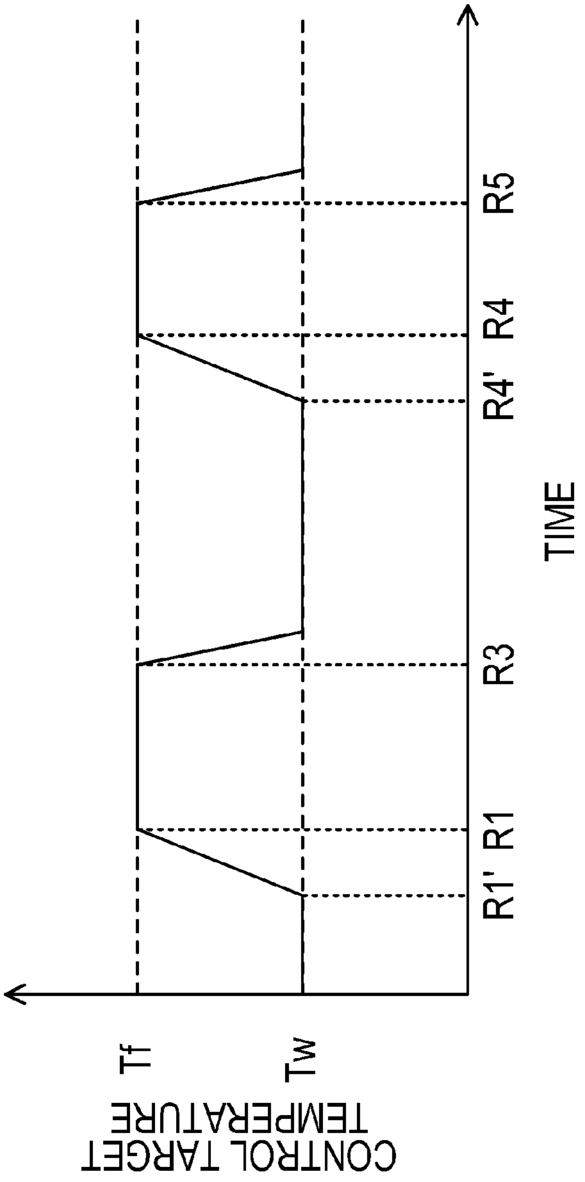
FIG. 5 shows temporal changes of the heater temperature of heating area A3 in Example 1.

In this case, the control target temperature for the heating area A3 of the heater is set as shown in FIG. 5. The control target temperature is set and kept at a temperature Tf that allows fixing (200° C.) during the period between timing R1 and timing R3 when the image portion 401-3 passes through the fixing nip portion N1, and during the period between timing R4 and timing R5 when the image portion 403-3 passes, so that the image portions are selectively heated.

Other areas on the recording material not formed with the unfixed image will be referred to as non-image portions, as opposed to the image portions described above. The power supply to the heater can be reduced by decreasing the temperature to a low level Tw (130° C.) at timings before R1, between R3 and R4, and after R5, when non-image portions are passing through the fixing nip portion N1.

To raise the temperature of the heater 300 or fixing film 202 from the low-temperature state to a temperature Tf that allows fixing, a rising time is necessary. Therefore, as shown in FIG. 5, the power supply to the heater is increased at the timings R1' and R4' respectively prior to the timings R1 and R4 when the images reach the fixing nip portion N1, to start raising the temperature of the heater 300 or fixing film 202.

All the image portions can be selectively heated by performing the operation described above in parallel for each of the heating areas A1 to A7.

Figure 6:
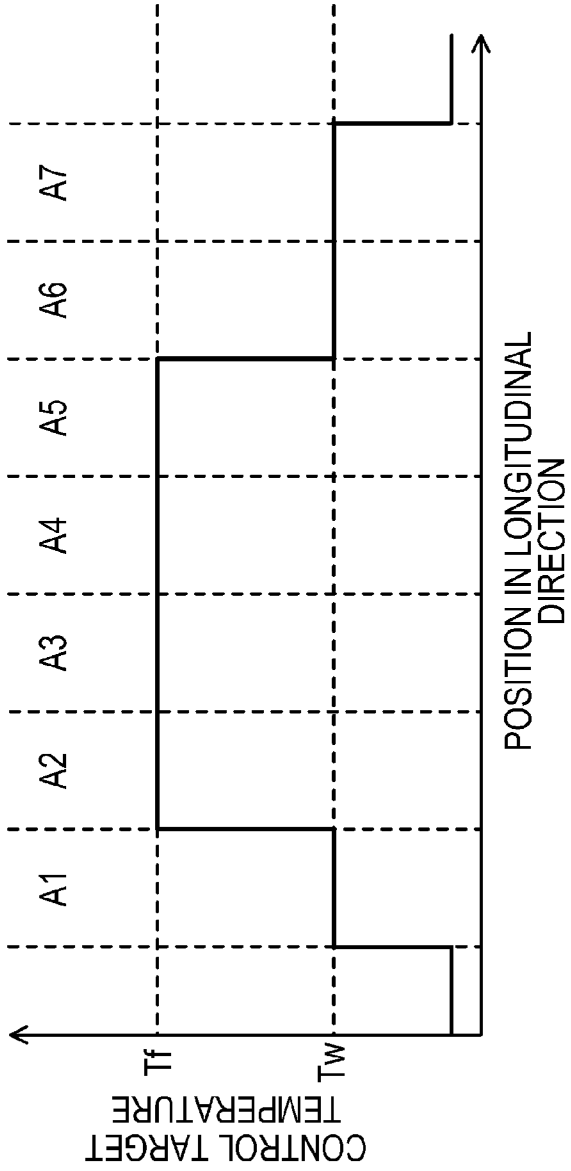
FIG. 6 shows a distribution of the control target temperatures at timing R2 of FIG. 4 in Example 1.

Such selective heating of image portions results in a distributions of the control target temperatures (temperature distribution) along the longitudinal direction of the heater 300 or fixing film 202 in accordance with the image layout. FIG. 6 shows a temperature distribution in the longitudinal direction of the heater (or fixing film) at the timing R2 when the image 401 in FIG. 4 is passing through the fixing nip portion N1. Of the plurality of heating areas described above, A2, A3, A4, and A5, which are the heating areas where the image passes through, are maintained at the high temperature Tf that allows fixing. On the other hand, A1, A6, and A7, which may be called non-image heating areas, where non-image portions, or non-image areas where the unfixed image is not formed, pass through, are maintained at the low temperature Tw.

Adhesion of Contaminating Toner Caused by Jam Clearing Process

Figure 7:
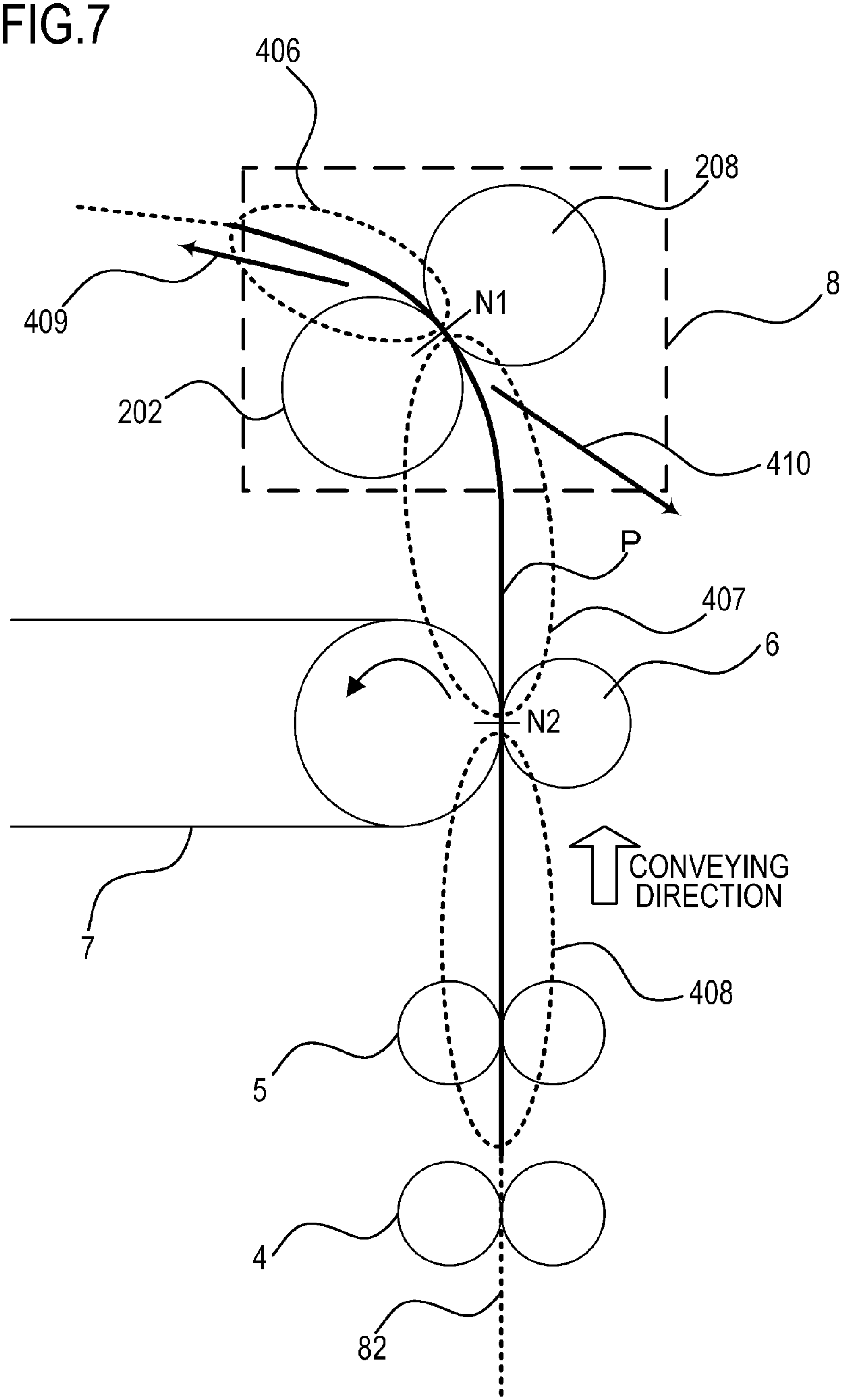
FIG. 7 is a diagram illustrating a recording material passing through a conveyance path and the fixing apparatus in Example 1.

Next, how contaminating toner adheres to the fixing film 202 or pressure roller 208 during a jam clearing process after the pause is described with reference to FIG. 7. FIG. 7 is a partially enlarged view of the surroundings of the conveyance path 82 of the recording material in the image forming apparatus of FIG. 1, illustrating how the recording material P in the course of image formation advances along the conveying direction upward in the drawing and passes through the fixing nip portion N1 of the fixing apparatus 8.

Reference numeral 406 in the drawing indicates an area of the recording material downstream of the fixing nip portion N1 in the conveying direction, which corresponds to an area where the fixing process of the toner image formed on the recording material P has been finished. Reference numeral 407 in the drawing indicates an area of the recording material between the fixing nip portion N1 and a transfer nip portion N2, which corresponds to an area where the toner image formed on the recording material P is present in the unfixed state. Reference numeral 408 in the drawing indicates an area upstream of the transfer nip portion N2 in the conveying direction, which corresponds to an area where the toner image is not formed on (transferred to) the recording material yet.

In the event of image formation being paused due to a jam or the like in the state illustrated in FIG. 7, a jam clearing process needs to be carried out to remove the recording material from the fixing apparatus 8 or from the conveyance path 82. When the recording material P is removed by being pulled in the direction of arrow 409, the unfixed toner present in the area denoted at 407 in the drawing on the recording material P adheres to the fixing film, and the adhered toner then transfers also to the pressure roller via the fixing nip portion N1. When the recording material is pulled out and removed in the direction of arrow 410, there is a possibility that the toner may melt when the toner image that has already been fixed contacts the high-temperature fixing film again, and adhere.

On the other hand, even though the apparatus has come to a halt in the middle of image formation, no contaminating toner adheres during the jam clearing process if the distal end of the recording material P has not reached the fixing nip portion N1 of the fixing apparatus 8 yet, or if the rear end of the recording material P has finished passing through the fixing apparatus 8.

Cases where Contaminating Toner Fails to be Removed after Pause

In the fixing apparatus that selectively heats image portions, there are cases where toner that has adhered (adhered toner) is not removed right away, after the pause status of image forming operation has been cancelled and a recording material is fed to the fixing apparatus for image formation. Specifically, there are the following Case 1 and Case 2.

Case 1: When Image Forming Areas Change after Pause in Image Forming Operation

Figure 8:
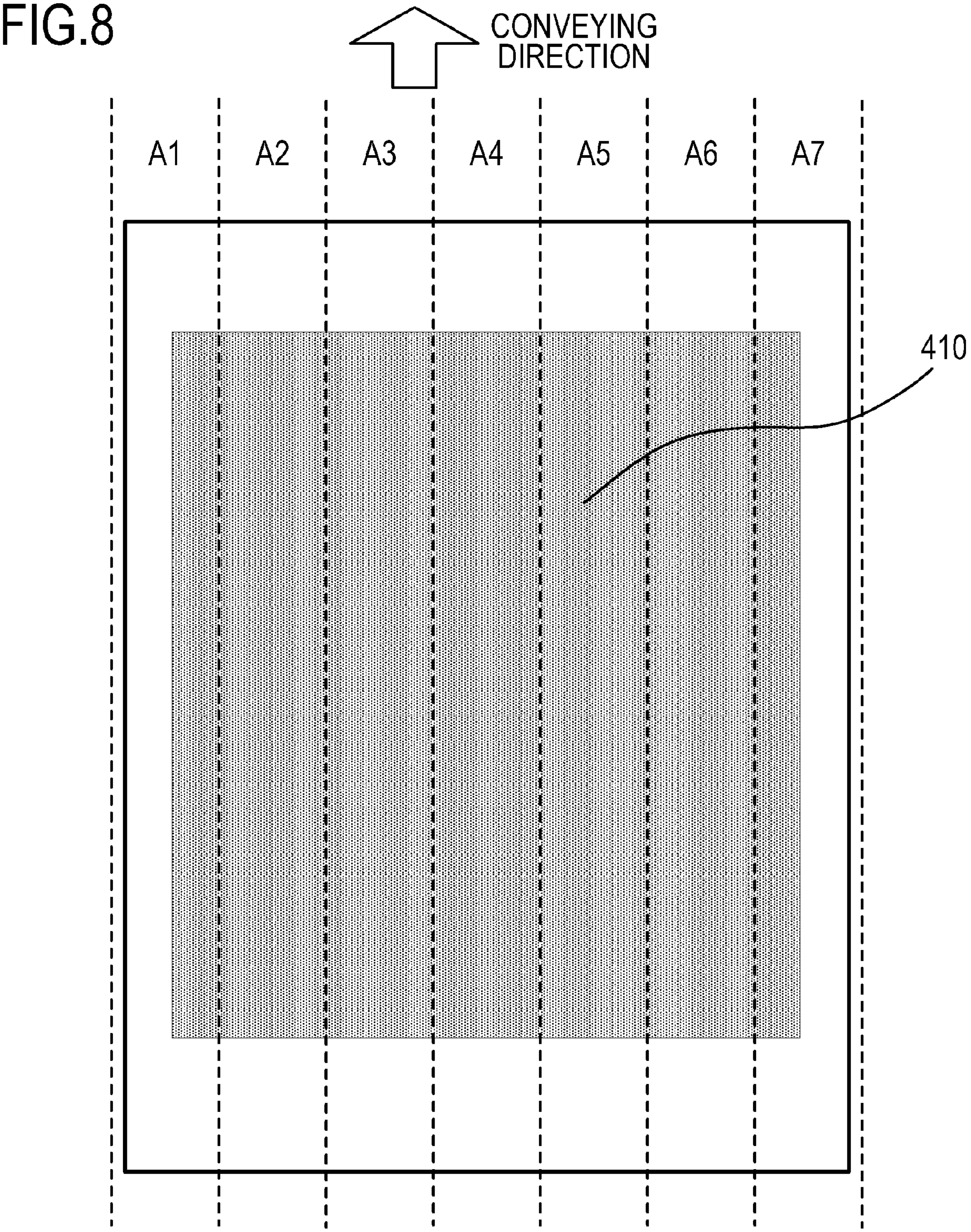
FIG. 8 is a diagram illustrating an image extending over many heating areas in Example 1.

Let us suppose a case where, as illustrated in FIG. 8, the apparatus pauses when a recording material P is passing through the fixing apparatus 8, carrying an image formed thereon with a large number of heating areas where an unfixed image is heated along the longitudinal direction orthogonal to the conveying direction of the recording material P. In the case where, after this pause status is cancelled, an image with fewer heating areas where an unfixed image is heated such as the one shown in FIG. 9 is formed, the adhered toner is not readily removable.

In FIG. 8, the image is formed over the heating areas A1 to A7 on the recording material. If the apparatus pauses, with a recording material formed with the image such as the one in FIG. 8 nipped in the fixing nip portion of the fixing apparatus as illustrated in FIG. 7, the toner may adhere to the fixing film and pressure roller in the heating areas A1 to A7 during a jam clearing process.

Figure 9:
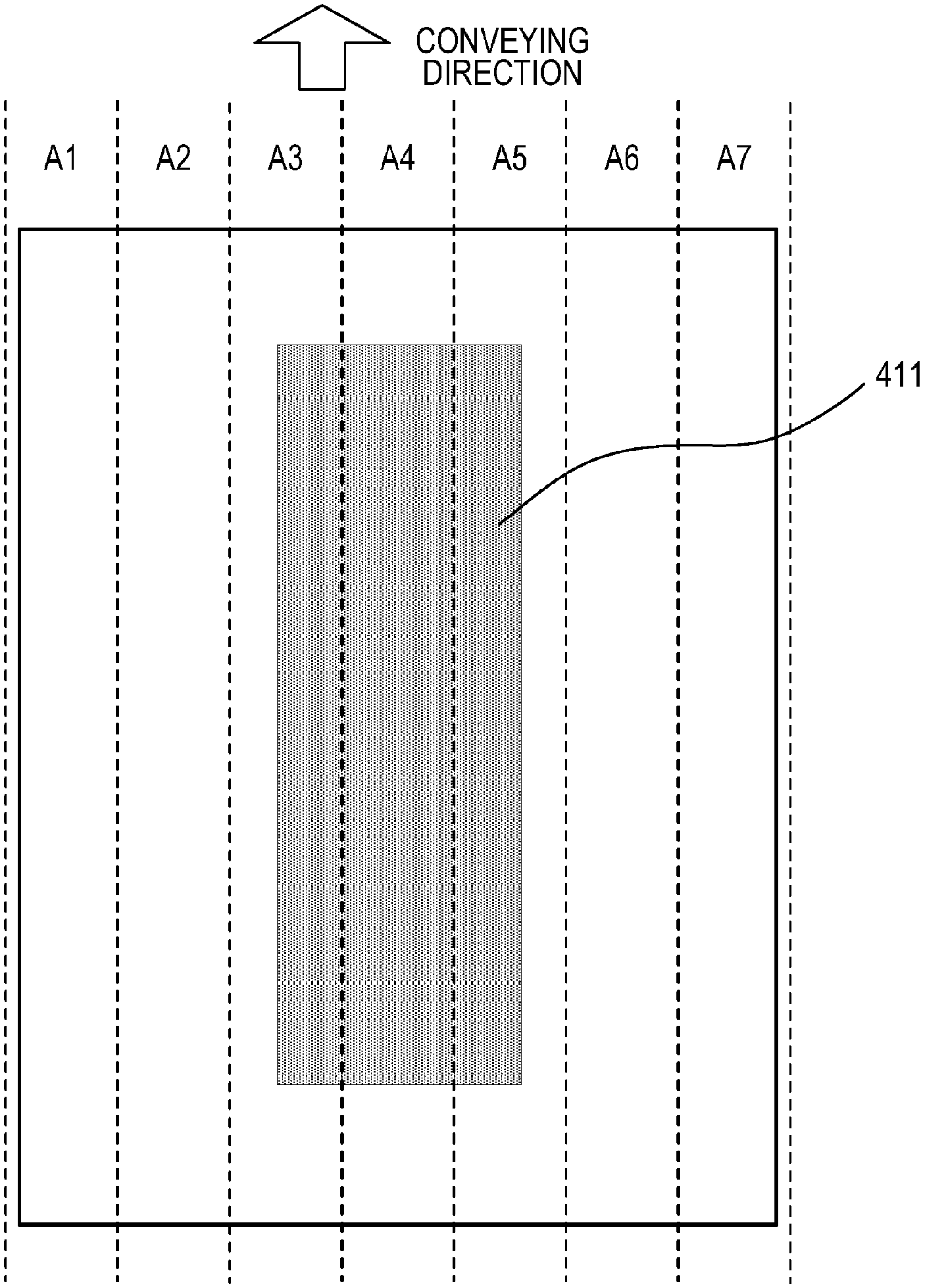
FIG. 9 is a diagram illustrating an image extending over few heating areas in Example 1.
Figure 10A:
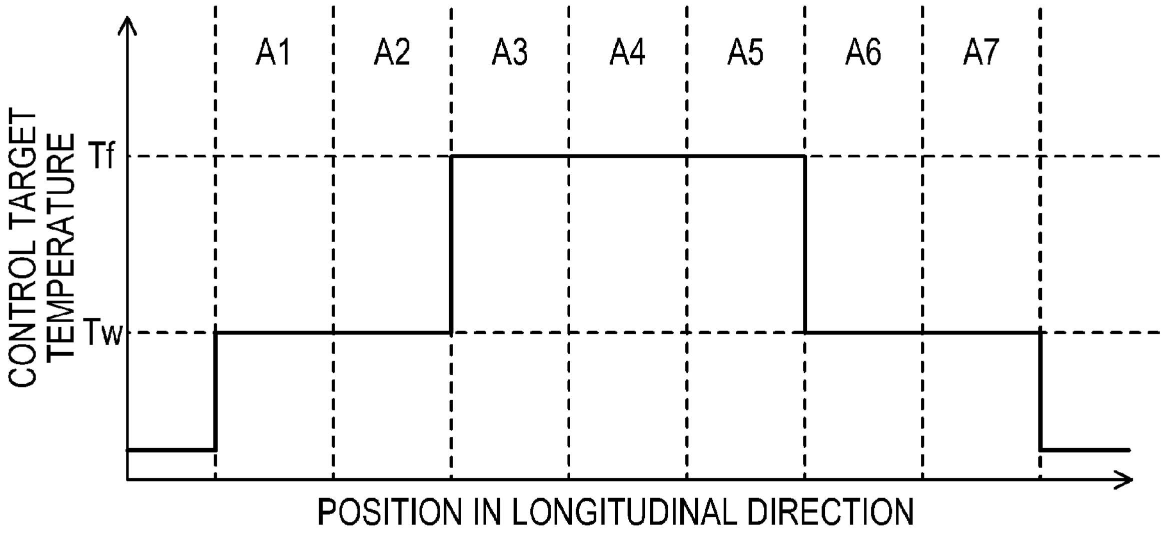
FIG. 10A and FIG. 10B show the distributions of the control target temperatures of the heater before and after a pause in Example 1.

FIG. 10A shows a normal temperature distribution for the fixing process of the image of FIG. 9 with few heating areas where an unfixed image is heated. After the pause status is cancelled, when the fixing process is performed with such a temperature distribution, the heater 300 is heated to the high temperature Tf that allows fixing in the heating areas A3 to A5 corresponding to the unfixed image formed on the recording material. Consequently, any toner that may have adhered to the fixing film or pressure roller can readily move to the recording material and be removed. On the other hand, in the heating areas A1, A2, A6, and A7 corresponding to areas not formed with the unfixed image, the heater 300 is maintained at the low temperature Tw, so that adhered toner cannot be transferred to the recording material and removed. If the image shown in FIG. 8 is to be formed repeatedly after that, the adhered toner can readily remain on the fixing film 202 and pressure roller 208.

Case 2: When Recording Material is Laterally Displaced During Jam Clearing Process Let us suppose a case where, as opposed to Case 1, the apparatus pauses when the recording material P is passing through the fixing apparatus 8, carrying an image formed thereon with a small number of heating areas where an unfixed image is heated along the axial direction of the pressure roller 208 that forms the fixing nip portion N1, which is the longitudinal direction orthogonal to the conveying direction of the recording material P. In this case, too, adhered toner is hard to be removed when the recording material P is displaced in the longitudinal direction during the jam clearing process.

The fixing apparatus 8 of this example automatically separates the nip portion, releasing the formation of the nip portion, to allow the user to easily remove the recording material P stuck in the fixing nip portion N1 during the pause as mentioned above. When the nip portion is separated, the pressure applied to the nip portion as the force to retain the recording material P in the fixing nip portion N1 is lowered and weakened, so that it is often the case that the recording material P is displaced in the longitudinal direction mentioned above (displaced laterally) during the jam clearing process in which the user removes the recording material P. This sometimes results in enlargement of the area where toner adhesion occurs in the direction of the displacement.

Here let us suppose that an image with few heating areas where an unfixed image is heated such as the one shown in FIG. 9 was being formed in both cases where the apparatus paused and after the pause status was cancelled.

While the image shown in FIG. 9 is formed over the heating areas A3 to A5, contaminated area will extend beyond the heating areas A3 to A5, if the recording material is displaced during the jam clearing process. Assuming that the contaminated area enlarged due to a lateral displacement and extended over the areas A1 to A5, if, after the cancellation of the pause status, the same image as the one shown in FIG. 9 continues to be formed with the normal temperature distribution shown in FIG. 10A, the toner adhered on the heating areas A1 and A2, which correspond to non-image areas, is hard to be removed similarly to Case 1.

Change of Longitudinal Distribution after Cancellation of Pause Status

Next, the characteristic feature of this example is described. The most characteristic feature of this example is change of the distribution of control target temperature of the heater (or fixing film) from a distribution of control target temperature in normal time, after the pause status of the image forming apparatus is cancelled. More specifically, the control portion sets the control target temperature of a non-image heating area for heating a non-image area where the image on the recording material is not formed after the jam clearing process higher than the control target temperature of the non-image heating area before the jam clearing process. In addition, the control portion sets a difference between the control target temperature before the jam clearing process and the control target temperature after the jam clearing process in the non-image heating area to be larger than that in the image heating area. In this way, when forming the image after a jam clearing process in which the image forming apparatus is stopped and the recording material nipped in the nip portion is removed, the control portion changes a distribution of the control target temperature of the whole heater in the direction in which the plurality of heat-generating elements are aligned to a second distribution different from a first distribution corresponding to the image.

Description of the operation of the apparatus in this example follows. After a pause condition has occurred, first, it is determined if a recording material P is remaining inside the fixing apparatus, by using the entrance recording material sensor 215 and exit recording material sensor 216 of the fixing apparatus 8 illustrated in FIG. 2. In this example, whether or not the distribution of control target temperature is to be changed is determined at this stage, when performing image formation after the cancellation of the pause status. Namely, when there is no jammed recording material P in the nip portion but jammed recording material P in a position other than the nip portion, the control portion does not change the distribution of the control target temperature after the jam clearing process, because there is no possibility of toner adhesion.

After the user has carried out a jam clearing process and closed the door, the apparatus waits until the entrance recording material sensor 215 and exit recording material sensor 216 detect that the recording material P has been removed from the fixing apparatus. If there is another factor that caused the image forming apparatus to pause, the apparatus waits until the pause is cancelled.

When restarting image formation after the cancellation of the pause status, only when the temperature distribution is to be changed in accordance with the determination mentioned above, the temperature distribution is changed such as to increase the temperature of the heating areas where no image is to be formed by a larger amount than the temperature rise for the heating areas where an image is to be formed.

Figure 10B:
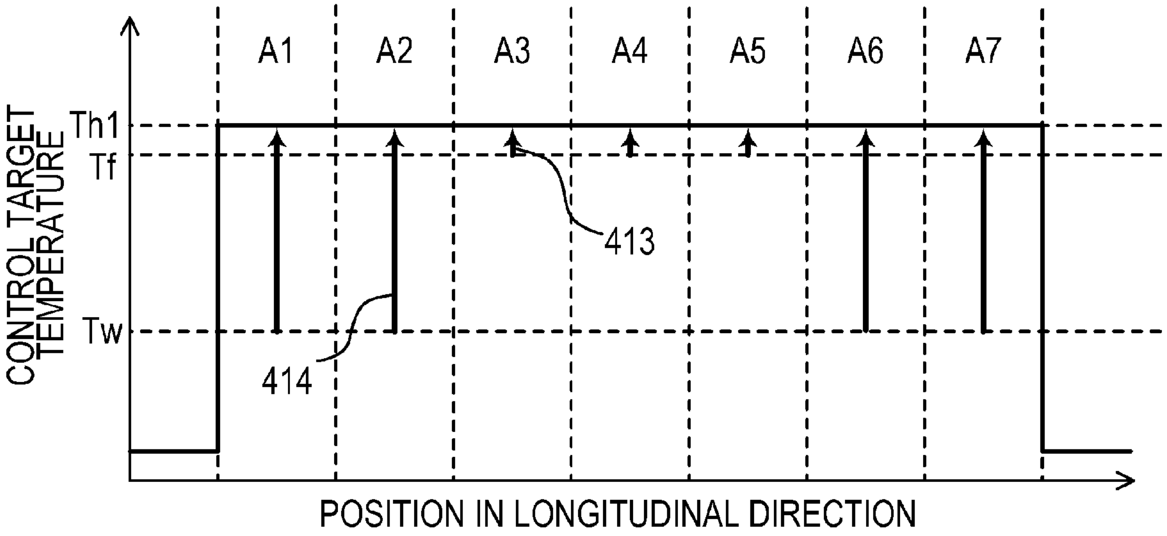

An example in the case of forming the image illustrated in FIG. 9 after a pause is described. In comparison to the distribution of the control target temperature in normal time shown in FIG. 10A (first distribution), which is when the jam clearing process was not performed, the amount of temperature rise 414 for the heating areas that heat areas of the recording material not formed with the unfixed image is larger than the amount of temperature rise 413 for the heating areas that heat areas formed with the unfixed image, as shown in FIG. 10B (second distribution).

The control target temperature (image heating temperature) of the heating areas A3, A4, and A5 that heat areas formed with the unfixed image was raised from the temperature Tf that allows fixing (200° C.) to an even higher temperature Th1 (207° C.) that accelerates removal of adhered toner without affecting the image. A temperature rise to more than Th1 resulted in adverse effects on the image such as hot offset and increased glossiness. On the other hand, the control target temperature of the heating areas A1, A2, A6, and A7 that heat areas not formed with the unfixed image (non-image heating temperature) was raised from the low temperature Tw (130° C.) to Th1, i.e., the temperature was raised by a wider margin than for the image portions described above.

By increasing the temperature of the heating areas that heat areas not formed with the unfixed image after the pause by a wider margin, the adhered toner is softened or melted, and can be transferred onto the recording material P and removed. Adhered toner may not be completely removed even with the change of the distribution of control target temperature by a passage of one recording material, and therefore the change may be continued until after several times of image formation after the pause.

The results of an actual test in Case 1 and Case 2 mentioned above were as follows, wherein how much adhered toner remained was checked when the image shown in FIG. 9 was printed on five sheets of paper after printing a black solid block as the image portions of FIG. 8 and FIG. 9: In Case 1, toner adhesion was observed on parts of the pressure roller corresponding to the positions of the heating areas A1, A2, A6, and A7, and on the fixing film, after printing on five sheets of paper in a comparative example in which no change was made to the distribution of the control target temperature. In Case 2, toner adhesion was observed on a part of the pressure roller corresponding to the position of the heating area A2, which coincides in the direction in which a longitudinal displacement occurred during the jam clearing process. On the other hand, in the case where the distribution of the control target temperature was changed as in this example, no toner adhesion was observed after printing on five sheets of paper.

As described above, making the distributions of the control target temperature of the heater or fixing film different before and after the pause status could prevent adhered toner staying for a long time and sticking, which may arise in a fixing apparatus that selectively heats image portions, when areas not formed with an unfixed image are repeatedly heated after the pause such as Case 1 and Case 2 described above.

Other Embodiments of this Example

Figure 11A:
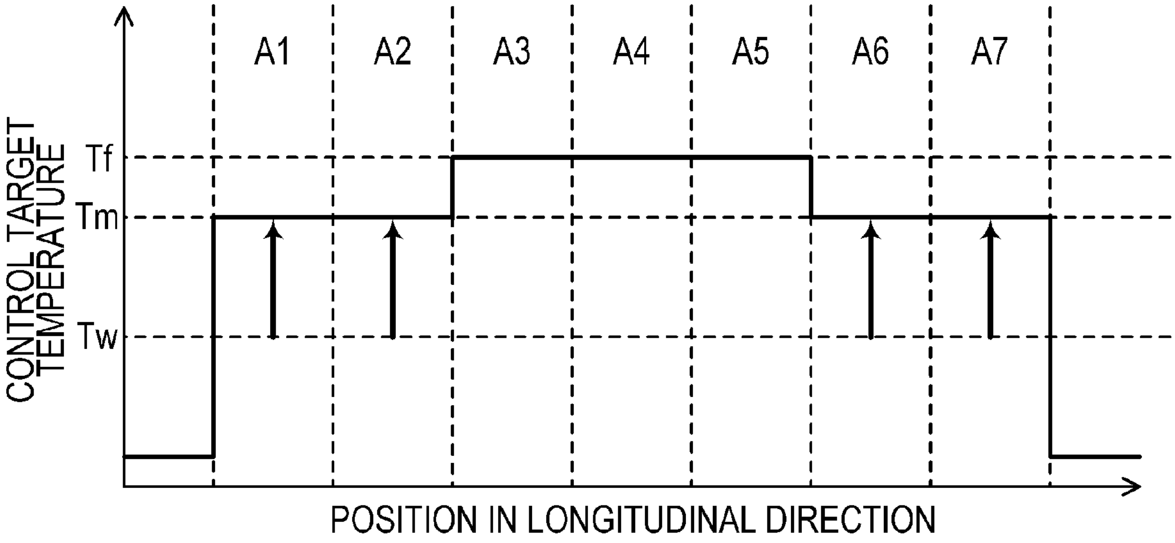
FIG. 11A and FIG. 11B show the distributions of the control target temperatures of the heater when forming an image after a pause in other embodiments of Example 1.

In this example, when forming an image after a pause, the temperature of a heating area that heats an area not formed with an unfixed image is raised by a larger amount than the temperature rise for a heating area that heats an area formed with the unfixed image. In such a case, the temperature was made equal in both areas as shown in FIG. 10B in the example, but the temperature need not necessarily be made equal. As shown in the temperature distribution of FIG. 11A, as long as removal of adhered toner is accelerated, the temperature of the heating area that heats the area not formed with the unfixed image may be set to Tm that is lower than the temperature of the area to be formed with the image, or Tf, so as to also achieve a power reduction. Similarly, the temperature for the area to be formed with the image need not necessarily be raised from Tf.

Figure 11B:
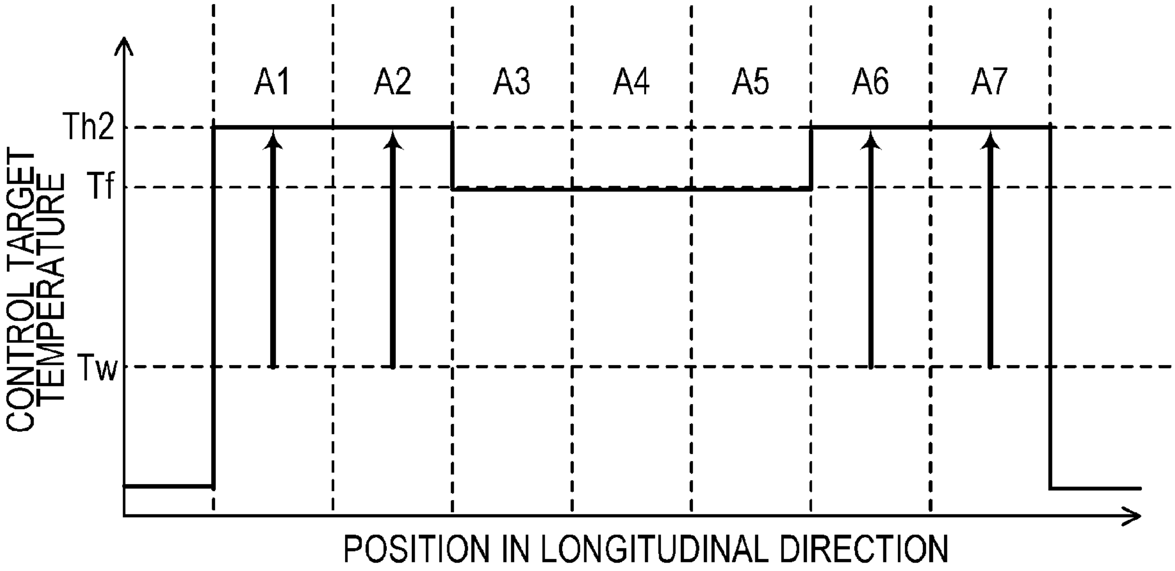

Alternatively, as shown in FIG. 11B, the control target temperature of a heating area that heats an area not formed with the unfixed image may be raised to temperature Th2 that is higher than temperature Th1 that does not affect the image in the area formed with the unfixed image. In the area not formed with the unfixed image, there are no worries of adverse effects of a high temperature on the image such as increased glossiness of the image or hot offset. Any contaminating toner that may have adhered is mostly transferred onto the pressure roller as mentioned above so that hot offset resulting from contaminating toner is unlikely to occur. Raising the temperature offers an advantage that removal of contaminating toner is accelerated.

When the apparatus comes to a halt during continuous paper feeding, there may be a case where several recording materials remain in the conveyance path of the apparatus. In this case, the apparatus can perform, after the pause, an operation of automatically conveying any remaining recording material that the user failed to remove. In such a case, if a preceding recording material immediately before the automatically discharged recording material was also in the course of being conveyed at the time when the pause condition occurred, the fixing film or pressure roller could have been contaminated with toner when the user removed the preceding recording material.

Accordingly, the temperature distribution when the automatically conveyed recording material passes through the fixing nip portion is also changed from a temperature distribution when the recording material passes through the fixing nip portion if the apparatus were operating normally (e.g., temperature distribution in normal time such as the one in FIG. 10A). Namely, by increasing the temperature of the heating areas that heat areas not formed with the unfixed image as shown in FIG. 10B, it is possible to accelerate removal of contaminating toner.

In the example described above, the distributions of the control target temperature of the heater are made different before and after the occurrence of a pause condition. The temperature of the fixing film in direct contact with the heater is linked to that of the heater so that the fixing film has the same temperature distribution as the heater, although the absolute values of temperatures are different. Therefore, the distribution of the control target temperature of the fixing film may be changed similarly.

Example 2

The characteristic feature of this example is change of the distribution of control target temperature of the heater in accordance with image information of the image that was being formed when a pause condition occurred for image formation after the pause status is cancelled.

As mentioned above, during a jam clearing process to remove a recording material P from the fixing apparatus 8, the recording material P may be displaced in the longitudinal direction as described above and unfixed toner may adhere to the fixing film in parts corresponding to the heating areas that heat areas not formed with the unfixed image, or to parts of the pressure roller. On the other hand, the amount of such longitudinal displacement is minimal, so that the area unfixed toner may adhere, in the heating areas that heat areas not formed with the unfixed image, is often limited to parts adjacent to the heating areas where an image is to be formed. This is because the recording material P is not completely freely movable in the longitudinal direction because of the small gap even if the fixing film 202 and the pressure roller 208 separate from each other during the pause.

In this example, when forming an image after a pause, the distribution of the control target temperature is changed as follows, using the image information, acquired by the acquisition portion 129-1, of the image that was being formed when the pause condition occurred. First, a heating area that heats an area on the recording material where no image is to be formed after the pause, and where an image was being formed when the pause condition occurred, to be subjected to the fixing process in the fixing apparatus 8 after the jam clearing process, is called a first heating area. Next, a heating area adjacent thereto, for heating an area on the recording material where no image is to be formed after the pause, and where no image was being formed when the pause condition occurred, is called a second heating area. The temperature was raised only for overlapping first heating area and second heating area to facilitate removal of adhered toner. This is described in further detail below with reference to the drawings.

Figure 12:
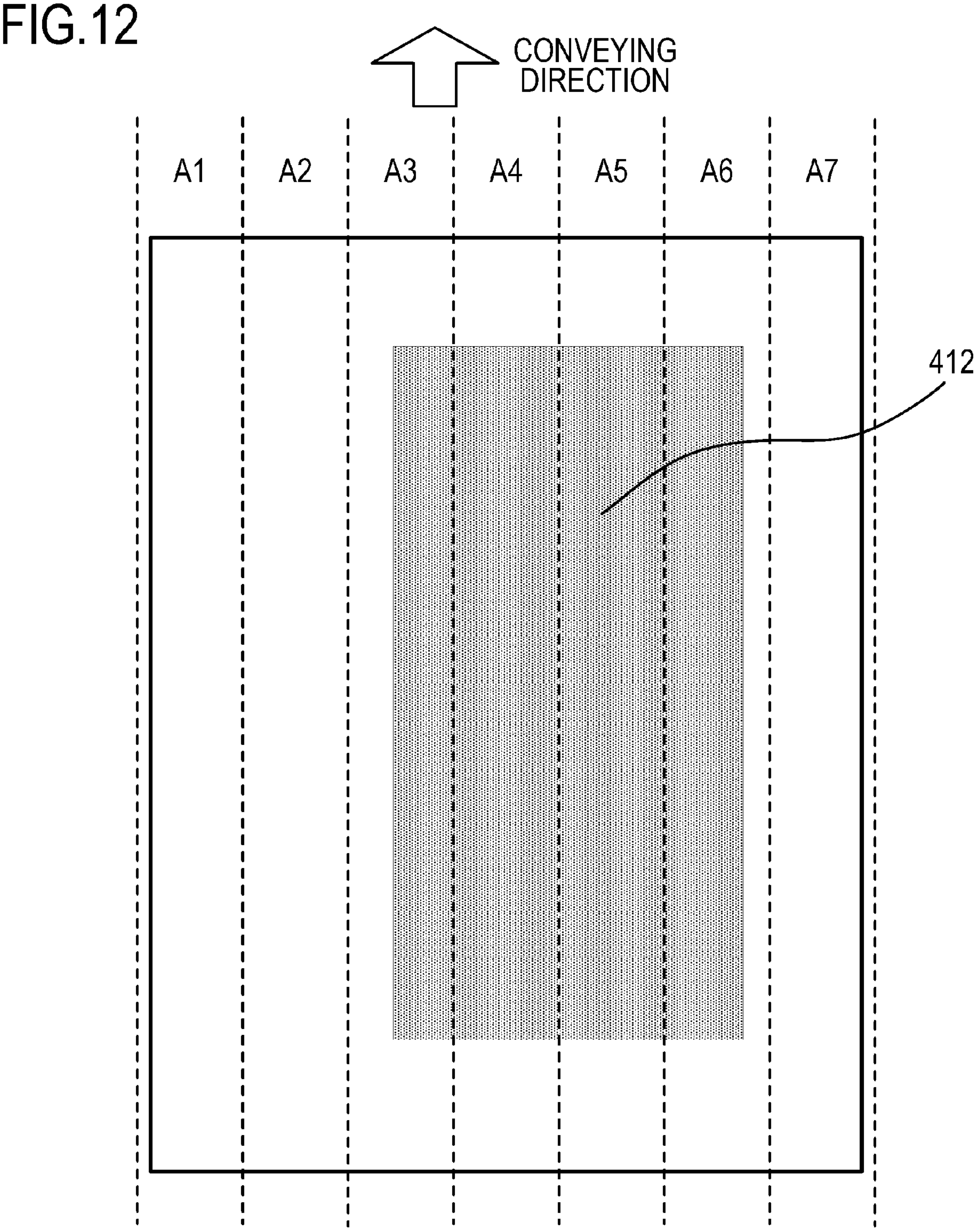
FIG. 12 is a diagram illustrating an image that was being formed when the apparatus paused in Example 2.

Let us assume a case where an image shown in FIG. 12 was being formed when a pause condition occurred, and an image shown in FIG. 9 is to be formed after the pause status is cancelled. In FIGS. 12, A3, A4, A5, and A6 are the heating areas that heat areas formed with the image, and A2 and A7 are adjoining heating areas. For image formation after the pause, this information regarding the image at the time of the pause is compared with heating areas A1, A2, A6, and A7 that heat areas not to be formed with the image shown in FIG. 9 after the pause, and the temperature is raised only for the overlapping areas A2, A6, and A7. Namely, the heating area that corresponds to the first heating area described above is A6, which is formed with the unfixed image in FIG. 12, but not formed with the unfixed image in FIG. 9 that represents the condition after the pause. The heating area that corresponds to the second heating area described above is A2 and A7 that heat areas not formed with the unfixed image both in FIG. 12 and in FIG. 9.

Figure 13A:
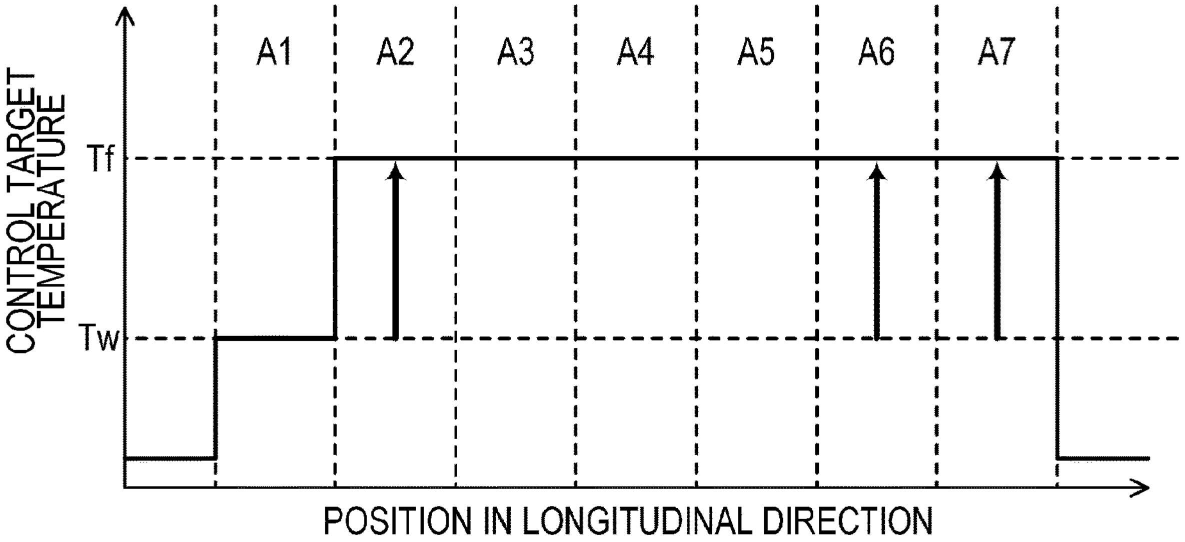
FIG. 13A and FIG. 13B show the distributions of the control target temperatures of the heater when forming an image after a pause in Example 2.

FIG. 13A shows a temperature distribution of the heater when forming the image shown in FIG. 9 after a pause in this example. The temperature is raised only in areas where toner is likely to adhere because of the jam clearing process, while the temperature need not be raised in other areas. Thus, power consumption can be reduced while the efficiency of removing adhered toner is increased.

The amount of displacement during the jam clearing process varies depending on the presence or absence of, or the amount of, the gap between the fixing film and the pressure roller, or how much the pressure was reduced, during the pause. Whether the temperature distribution is to be changed, or the range of heating areas for which temperature is to be changed, may be determined depending on the presence or absence of the gap or the degree of pressure.

Figure 13B:
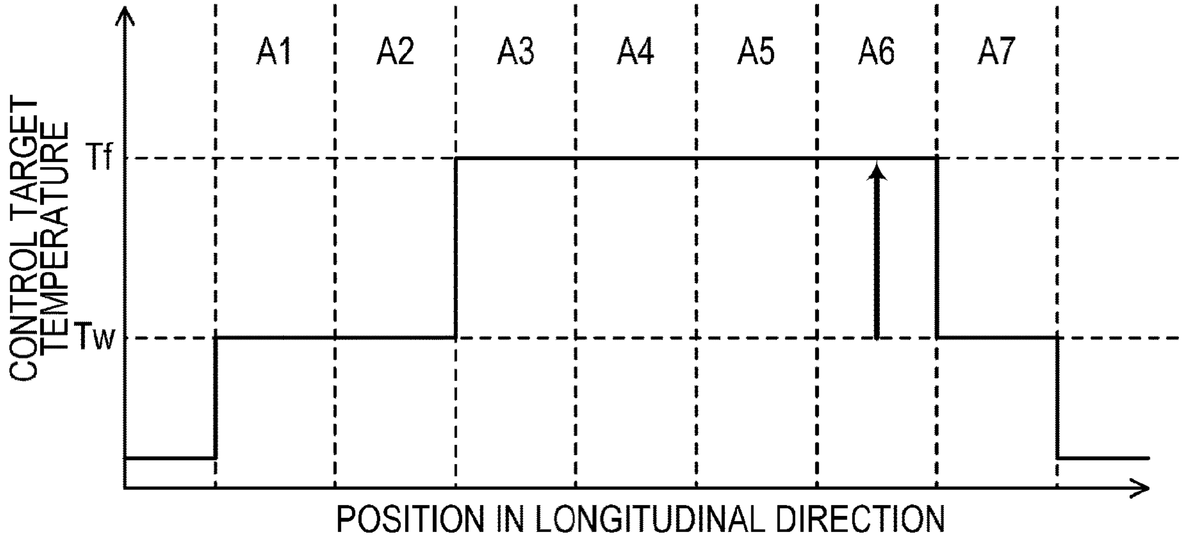

For example, in cases where the fixing apparatus does not perform separation in the pause, i.e., does not release the formation of the fixing nip portion N1 or maintains the pressure applied to the fixing nip portion N1, the recording material may be hardly displaced in the longitudinal direction thereof during the jam clearing process by the user. In such a case, the control target temperature may be raised only for the heating area A6, which is formed with the image at the time of the pause and which is not to be formed with the image after the pause, i.e., the first heating area described above, as in the temperature distribution shown in FIG. 13B.

Example 3

The characteristic feature of this example is change of the distribution of control target temperature of the heater in accordance with image information of the image that was being formed when a pause condition occurred, and the timing when (or position where) the recording material stopped, for image formation after the pause status is cancelled.

Toner adhesion is likely during a jam clearing process to remove a recording material P stuck in the fixing apparatus 8 in the pause mainly in the area shown in FIG. 7 along the conveying direction between the fixing nip portion N1 and the transfer nip portion N2 where the fixing process was not finished at the time when the pause condition occurred. Namely, if an image is present in this area, toner is likely to adhere since the toner is not fixed yet.

Therefore, when a pause condition arises and the apparatus stops the operation, this timing is detected to determine the conveying position of the recording material P. If, for example, the time between when the distal end of the recording material P passed the entrance recording material sensor 215 illustrated in FIG. 2 and the timing when the pause condition occurred is known, the lengths in the conveying direction of the area on the recording material P where the fixing process was finished and the area where the fixing treatment is not carried out yet at the time of the pause can be determined. Thereafter, the distribution of the control target temperature may be changed similarly to Example 2 in accordance with the presence or absence of an image in each heating area of the area not subjected to the fixing process yet.

Namely, an area on the recording material formed with the unfixed image that is not subjected to the fixing process yet is called a non-heated image area, and a heating area that is going to heat this non-heated image area is called a third heating area. An area on the recording material that is not subjected to the fixing process yet, and not formed with the unfixed image, is called a non-heated non-image area, and a heating area that is going to heat this non-heated non-image area and that is adjacent the third heating area described above is called a fourth heating area. In the third heating area, the unfixed image is not heated yet, so that the toner is likely to adhere during the jam clearing process. In the fourth heating area adjacent the third heating area, too, the toner is likely to adhere should the recording material be displaced laterally. Accordingly, the control target temperature when heating the areas on the recording material not formed with the unfixed image, in the third heating area and fourth heating area, is set in accordance with the control target temperature for when heating the area formed with the unfixed image. By setting the control target temperature this way, only the toner in the area where toner is likely to adhere can be transferred onto the recording material and removed.

Figure 14:
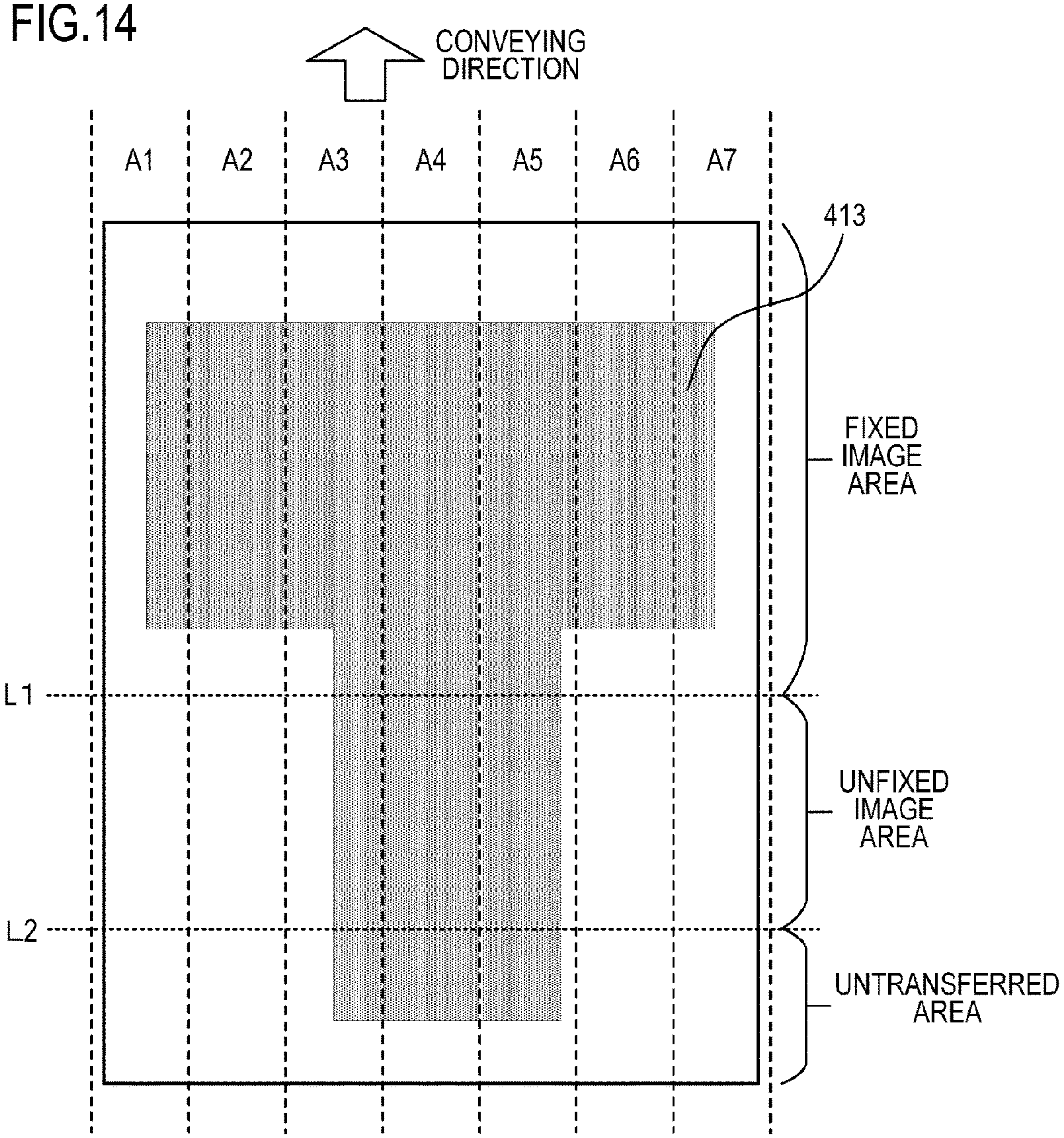
FIG. 14 is a diagram illustrating an image that was being formed when the apparatus paused in Example 3.

For example, let us assume a case where an image 413 shown in FIG. 14 is being formed on the recording material P and the apparatus comes to a halt when points L1 and L2 of the image 413 are respectively passing through the fixing nip portion N1 and the transfer nip portion N2. Heating areas where the image is to be formed, in the area on the recording material along the conveying direction between L1 and L2 that are not subjected to the fixing process yet, are A3, A4, and A5. Namely, the areas that may be contaminated are expected to be A3 to A5, or their adjoining areas A2 and A6. Therefore, which one of the heating areas where the image is not to be formed should be heated to a higher temperature may be determined based on the image to be formed after the pause, similarly to Example 2.

This example allows for more precise determination of heating areas where toner adhesion may occur, so that power consumption can be reduced while the efficiency of removing adhered toner is increased.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An image forming apparatus for forming a toner image on a recording material, the image forming apparatus comprising:

a photosensitive member;

a developing roller configured to supply toner to the photosensitive member and to form the toner image;

a fixing portion configured to heat the toner image formed on the recording material, wherein the fixing portion includes a nip portion forming member configured to form a nip portion to nip the recording material on which the toner image is formed, and a heater having a plurality of heat-generating elements arranged in a longitudinal direction of the heater orthogonal to a conveying direction of the recording material, and a control portion configured to independently control power supplied to the plurality of heat-generating elements, wherein the control portion is configured to change a heat distribution by the plurality of heat-generating elements in the longitudinal direction of the heater orthogonal to the conveying direction of the recording material in accordance with an image to be formed on the recording material, wherein in a case where the image is formed on a central area of the recording material in the longitudinal direction, and the image is not formed on an end area of the recording material in the longitudinal direction, the control portion sets a first heat distribution in which a heating amount of one of the plurality of heat-generating elements corresponding to the central area is larger than that of another one of the plurality of heat-generating elements corresponding to the end area, wherein, when a remaining recording material formed with the image on the central area but not formed on the end area and remaining in a conveyance path is automatically discharged after interruption of a printing operation for a plurality of recording materials, the control portion changes the heat distribution from the first heat distribution to a second heat distribution different from the first heat distribution during the automatically discharging, and wherein a temperature of the end area of the recording material during the automatically discharging is higher than a temperature of the end area of the recording material during the printing operation.

2. The image forming apparatus according to claim 1, wherein the nip portion forming member includes a tubular film, and the image forming apparatus further includes a pressure member configured to form the nip portion between the pressure member and an outer surface of the tubular film where the heater is disposed inside of the tubular film.

3. The image forming apparatus according to claim 2, wherein the tubular film is sandwiched between the heater and the pressure member.

4. An image forming apparatus for forming a toner image on a recording material, the image forming apparatus comprising:

a photosensitive member;

a developing roller configured to supply toner to the photosensitive member and to form the toner image;

a fixing portion configured to heat the toner image formed on the recording material, wherein the fixing portion includes a nip portion forming member configured to form a nip portion to nip the recording material on which the toner image is formed, and a heater having a plurality of heat-generating elements arranged in a longitudinal direction of the heater orthogonal to a conveying direction of the recording material, and a control portion configured to independently control power supplied to the plurality of heat-generating elements, wherein the control portion is configured to set a control target temperature for each of the plurality of heat-generating elements in accordance with an image to be formed on the recording material, wherein in a case where the image is formed on a central area of the recording material in the longitudinal direction, and the image is not formed on an end area of the recording material in the longitudinal direction, the control portion sets the control target temperature of one of the plurality of heat-generating elements corresponding to the central area to a first control target temperature, and sets the control target temperature of another one of the plurality of heat-generating elements corresponding to the end area to a second control target temperature, wherein the first control target temperature is higher than the second control target temperature, and wherein, when a remaining recording material formed with the image on the central area but not formed on the end area and remaining in a conveyance path is automatically discharged after interruption of a printing operation for a plurality of recording materials, the control portion changes the second control target temperature to a third control target temperature higher than the second control target temperature during automatically discharging.

5. The image forming apparatus according to claim 4, wherein the nip portion forming member includes a tubular film, and the image forming apparatus further includes a pressure member configured to form the nip portion between the pressure member and an outer surface of the tubular film where the heater is disposed inside of the tubular film.

6. The image forming apparatus according to claim 5, wherein the tubular film is sandwiched between the heater and the pressure member.

7. The image forming apparatus according to claim 4, wherein the thirds control target temperate is higher than the first control target temperature.

8. An image forming apparatus for forming a toner image on a recording material, the image forming apparatus comprising:

a photosensitive member;

a developing roller configured to supply toner to the photosensitive member and to form the toner image;

a fixing portion configured to heat the toner image formed on the recording material, wherein the fixing portion includes a nip portion forming member configured to form a nip portion to nip the recording material on which the toner image is formed, and a heater having a plurality of heat-generating elements arranged in a longitudinal direction of the heater orthogonal to a conveying direction of the recording material, and a control portion configured to independently control power supplied to the plurality of heat-generating elements, wherein the control portion is configured to set a control target temperature for each of the plurality of heat-generating elements in accordance with an image to be formed on the recording material, wherein in a case where the image is formed on a central area of the recording material in the longitudinal direction, and the image is not formed on an end area of the recording material in the longitudinal direction, the control portion sets the control target temperature of one of the plurality of heat-generating elements corresponding to the central area to a first control target temperature, and sets the control target temperature of another one of the plurality of heat-generating elements corresponding to the end area to a second control target temperature, wherein the first control target temperature is higher than the second control target temperature, and wherein, when a remaining recording material formed with the image on the central area but not formed on the end area and remaining in a conveyance path is automatically discharged after interruption of a printing operation for a plurality of recording materials, the control portion sets the control target temperature for each of the plurality of heat-generating elements so that a distribution of the control target temperatures is flat over a passage region of the recording material in the longitudinal direction during automatically discharging.

9. The image forming apparatus according to claim 8, wherein the nip portion forming member includes a tubular film, and the image forming apparatus further includes a pressure member configured to form the nip portion between the pressure member and an outer surface of the tubular film where the heater is disposed inside of the tubular film.

10. The image forming apparatus according to claim 9, wherein the tubular film is sandwiched between the heater and the pressure member.

* * * * *